Patented Oct. 3, 1939

2,174,762

UNITED STATES PATENT OFFICE 2,174,762

CONDENSATION PRODUCTS DERIVED FROM AMINES AND METHOD OF PRODUCING THEM

Hermann Schuette, Mannheim, and Max Wittwer, Ludwigshafen-on-the-Rhine, Germany, assignors to I. G. Farbenindustrie Aktiengesellschaft, Frankfort-on-the-Main, Germany No Drawing. Original application April 13, 1935, Serial No. 16,259. Divided and this application February 15, 1939, Serial No. 256,557. In Germany April 19, 1934

9 Claims. (Cl. 260—458)

The present application is a divisional application of our copending application Ser. No. 16,259, filed April 13, 1935 and relates to new, valuable, condensation products which are suitable as assistants for the textile and related industries, and a process of producing same.

We have found that valuable, water-soluble (which term includes colloidally soluble) condensation products can be obtained by reacting an organic amine containing at least one reactive hydrogen atom in the molecule, with a compound capable of acting as an alkylene oxide free from other oxygen than the oxide oxygen and containing at least three carbon atoms in the molecule and effecting a "water-solubilizing step". The term "compound capable of reacting as an alkylene oxide free from other oxygen than the oxide oxygen and containing at least three carbon atoms in the molecule" comprises alkylene oxides with the said number of carbon atoms themselves, furthermore 1.2-propylene glycol and its higher homologues.

As amines suitable as initial material there may be mentioned for example butylamine, octylamine, cetylamine, oleylamine, aniline, phenylenediamine, benzidine, or naphthylamine and aminonaphthols. The said amines may also contain substituents, such as, for example, halogen atoms, nitro or sulphonic groups.

The water-solubilizing step which is to be applied to the products consists preferably in reacting them with a compound capable of reacting as a polyhydric alcohol of low molecular weight, usually with from 2 to 4, preferably with 2 carbon atoms per molecule, and containing one hydroxyl group per each carbon atom. As such compounds may be mentioned ethylene glycol, or ethylene oxide which are preferably employed in great excess; polyglycol ether radicles, such as, for example, diethylene, triethylene or tetraethylene glycol or polyglycerine, may also be introduced. In many cases it is advantageous to cause several of the said compounds to enter into reaction, preferably in several stages.

If the said preferred form of effecting the water-solubilizing step is employed, the sequence of the condensation with the compound capable of reacting as an alkylene oxide free from other oxygen than the oxide oxygen and containing at least 3 carbon atoms in the molecule and the said water-solubilizing step may be as desired. In other words, the entire process consists in acting on the amines containing at least one reactive hydrogen atom in any desired order with two different compounds, namely a compound capable or reacting as an alkylene oxide free from other oxygen than the oxide oxygen and containing at least three carbon atoms in and the molecule and with a compound capable of reacting as a low molecular polyhydric alcohol, containing one hydroxyl group per each carbon atom, or, speaking in greater detail, the amines may be first reacted with alkylene oxides containing at least three carbon atoms and then with polyhydric alcohols of low molecular weight or the procedure may be reversed by first causing the polyhydric alcohols of low molecular weight to react with the amines, the resulting condensation products thereupon being reacted with the alkylene oxides containing at least three carbon atoms in the molecule. When the resulting condensation products are not sufficiently soluble in water, they may be readily converted into a water-soluble condition by sulphonation or by the introduction of other groups capable of rendering them water-soluble.

In the condensation of the amines containing at least one reactive hydrogen atom per molecule with the compound capable of reacting as an alkylene oxide containing at least three carbon atoms, preferably several molecular proportions of the latter (for example of propylene oxide) are used for each molecular proportion of the initial material. The reaction is preferably effected in the presence of condensing agents, such as for example caustic soda solution, caustic potash solution, sodium ethylate, sodium acetate or activated bleaching earths, advantageously at elevated temperature and if desired under pressure. Instead of the said alkylene oxides, compounds which act in the same way, such as 1.2-propyleneglycol, may be employed. The alkylene oxide or like molecules probably add on to each other with the formation of ether-like chains of high molecular weight and one or more of these chains enter into the molecule depending on the initial materials employed.

The condensation with the compounds capable of reacting as polyhydric alcohols of low molecular weight is also advantageously carried out in the presence of the said condensing agents at elevated temperature and it is also preferable to work under increased pressure.

If such amines containing reactive hydrogen are employed as are high molecular (which contain at least 6, preferably at least 8, advantageously from 8 to 18 carbon atoms per molecule) the water-solubilizing step may consist in a sulphonation; this is effected in the usual manner by treating the products with sulphuric acid, oleum, sulphur trioxide or chlor-sulphonic acid, if desired in the presence of solvents or diluents or while adding compounds capable of withdrawing water.

The products obtainable according to the present invention are suitable, for example, as wetting, washing, dispersing, levelling, softening and like agents in the textile, leather, paper, lacquer, rubber and like industries, they are also capable of employment with advantage in the cosmetic and pharmaceutical industries in many cases. They have in particular a high protective colloid action and, for example, prevent to a great extent the separation of calcium soaps when working with soaps in hard water. Many of the products are also suitable as superfatting agents for soaps. The products may be advantageously employed together with other substances usually employed in the textile, leather, paper and like industries, for example, with soaps, Turkey red oils, true aliphatic sulphonic acids of high molecular weight, alkylated aromatic sulphonic acids, organic solvents, such as cyclohexanol, cyclohexanone, benzyl alcohol and carbon tetrachloride, or salts, such as Glauber's salt, alkali metal phosphates, waterglass and borates. They may also be employed together with oxidizing and reducing agents, such as sodium hypochlorite and sodium hydrosulphite, or with vegetable mucilages, glue, starch or ethylene oxide polymerization products.

The following examples will further illustrate the nature of this invention but the invention is not restricted to these examples. The parts are by weight.

*Example 1*

1 molecular proportion of dodecylamine is caused to react with 2 molecular proportions of epichlorhydrin which are added to the reaction mixture in small portions, 2 molecular proportions of propylene oxide then being brought into reaction at zero C. in the presence of 0.5 per cent of sodium ethylate. The resulting product is especially suitable as a superfatting agent for soaps or a substitute for lanoline.

*Example 2*

1 molecular proportion of cetyl amine is heated in an autoclave under pressure at about 150° C. with 4 molecular proportions of propylene oxide and then with from 12 to 16 molecular proportions of ethylene oxide. A water-soluble product is thus obtained which favors the formation of level dyeings in acid dyeing of wood.

What we claim is:

1. The process of producing condensation products which comprises reacting an amine containing at least one reactive hydrogen atom in the molecule with a compound capable of acting as an alkylene oxide free from other oxygen than the oxide oxygen and containing at least three carbon atoms in the molecule, and effecting a water-solubilizing step.

2. The process of producing condensation products which comprises reacting an amine containing at least one reactive hydrogen atom in the molecule in any desired sequence with a compound capable of acting as an alkylene oxide free from other oxygen than the oxide oxygen and containing at least three carbon atoms in the molecule, and a compound capable of reacting as a low molecular polyhydric alcohol, containing one hydroxyl group per each carbon atom.

3. The process of producing condensation products which comprises reacting an amine containing at least one reactive hydrogen atom in the molecule in any desired sequence with a compound capable of acting as an alkylene oxide free from other oxygen than the oxide oxygen and containing at least three carbon atoms in the molecule, and a compound capable of reacting as a polyhydric alcohol with from 2 to 4 carbon atoms per molecule and containing one hydroxyl group per each carbon atom.

4. The process of producing condensation products which comprises reacting an amine containing at least one reactive hydrogen atom in the molecule in any desired sequence with a compound capable of acting as an alkylene oxide free from other oxygen than the oxide oxygen and containing at least three carbon atoms in the molecule, and a compound capable of reacting as a polyhydric alcohol with from 2 to 4 carbon atoms per molecule and containing one hydroxyl group per each carbon atom and treating the product obtained with a sulphonating agent.

5. The process of producing condensation products which comprises reacting an amine containing at least 6 carbon atoms and at least one reactive hydrogen atom in the molecule with a compound capable of acting as an alkylene oxide free from other oxygen than the oxide oxygen and containing at least three carbon atoms in the molecule, and with a sulphonating agent.

6. Condensation products derived from an amine containing at least one reactive hydrogen atom in the molecule and from a compound capable of acting as an alkylene oxide free from other oxygen than the oxide oxygen and containing at least three carbon atoms in the molecule, and containing at least one water-solubilizing group.

7. Condensation products derived from an amine containing at least one reactive hydrogen atom in the molecule, from a compound capable of acting as an alkylene oxide free from other oxygen than the oxide oxygen and containing at least three carbon atoms in the molecule, and a compound capable of reacting as a low molecular polyhdric alcohol containing one hydroxyl group per each carbon atom.

8. Condensation products derived from an amine containing at least one reactive hydrogen atom in the molecule, from a compound capable of acting as an alkylene oxide free from other oxygen than the oxide oxygen and containing at least three carbon atoms in the molecule, and a compound capable of reacting as a low molecular polyhdric alcohol containing one hydroxyl group per each carbon atom, the said condensation products containing at least one sulphuric acid derivative group selected from the class consisting of the sulphuric ester and sulphonic acid groups.

9. Condensation products derived from an amine containing at least 6 carbon atoms and at least one reactive hydrogen atom in the molecule and from a compound capable of acting as an alkylene oxide free from other oxygen than the oxide oxygen and containing at least three carbon atoms in the molecule, and containing at least one sulphuric acid derivative group selected from the class consisting of the sulphuric ester and sulphonic acid groups.

HERMANN SCHUETTE.
MAX WITTWER.